US012082529B2

(12) United States Patent
Trowbridge et al.

(10) Patent No.: US 12,082,529 B2
(45) Date of Patent: Sep. 10, 2024

(54) WHEEL LOCKING ASSEMBLY FOR A HARVESTER HEADER

(71) Applicant: CNH Industrial America LLC, New Holland, PA (US)

(72) Inventors: Jeffrey C. Trowbridge, Stevens, PA (US); Jeffrey D. Thomas, Gordonville, PA (US); Joel Timothy Cook, Akron, PA (US)

(73) Assignee: CNH Industrial America LLC, New Holland, PA (US)

( * ) Notice: Subject to any disclaimer, the term of this patent is extended or adjusted under 35 U.S.C. 154(b) by 699 days.

(21) Appl. No.: 17/294,674

(22) PCT Filed: Oct. 29, 2019

(86) PCT No.: PCT/US2019/058608
§ 371 (c)(1),
(2) Date: May 17, 2021

(87) PCT Pub. No.: WO2020/101887
PCT Pub. Date: May 22, 2020

(65) Prior Publication Data
US 2022/0007578 A1    Jan. 13, 2022

Related U.S. Application Data

(60) Provisional application No. 62/768,537, filed on Nov. 16, 2018.

(51) Int. Cl.
*A01D 41/14*    (2006.01)
*A01D 69/03*    (2006.01)

(52) U.S. Cl.
CPC ........... *A01D 41/145* (2013.01); *A01D 69/03* (2013.01)

(58) Field of Classification Search
CPC ...... A01D 41/145; A01D 69/03; A01D 41/14; A01B 73/005
See application file for complete search history.

(56) References Cited

U.S. PATENT DOCUMENTS 2,943,688 A     7/1960  Cox et al.
4,174,603 A  * 11/1979  Parrish ................... A01D 41/14
                                                          56/DIG. 1
(Continued)

FOREIGN PATENT DOCUMENTS

CA      2150977 C  *  8/1999  ............. A01D 41/14
CA      3079285 A1 * 10/2010  ............. A01D 34/04
(Continued)

OTHER PUBLICATIONS

International Search Report for PCT application PCT/US2019/058608, mailed Feb. 10, 2020 (13 pages).

*Primary Examiner* — Arpad Fabian-Kovacs
(74) *Attorney, Agent, or Firm* — Peter K. Zacharias; Rebecca L. Henkel; Rickard K. DeMille

(57) ABSTRACT

A wheel assembly of a harvester header includes a latch and a pin. The pin is configured to engage the latch while a wheel of the wheel assembly is at a first position and the pin is configured to disengage the latch while the wheel of the wheel assembly is at a second position. Engagement of the pin and the latch is configured to block movement of the wheel relative to a frame of the harvester header.

18 Claims, 6 Drawing Sheets

(56) References Cited

U.S. PATENT DOCUMENTS

| | | | |
|---|---|---|---|
| 4,177,625 A * | 12/1979 | Knight | A01D 67/00 56/15.8 |
| 4,280,317 A * | 7/1981 | Lindblom | A01D 41/16 56/208 |
| 4,934,131 A | 6/1990 | Frisk et al. | |
| 4,944,141 A * | 7/1990 | Orlando | A01D 45/00 56/214 |
| 5,000,268 A | 3/1991 | Zimmerman | |
| 5,653,292 A * | 8/1997 | Ptacek | A01C 7/203 172/310 |
| 5,845,471 A | 12/1998 | Seegert et al. | |
| 5,970,695 A * | 10/1999 | Dunn | A01B 73/005 56/DIG. 14 |
| 6,666,010 B2 | 12/2003 | Beaufort et al. | |
| 7,197,865 B1 * | 4/2007 | Enns | A01D 41/14 56/228 |
| 7,661,251 B1 * | 2/2010 | Sloan | A01D 41/145 60/413 |
| 7,926,249 B1 * | 4/2011 | Cook | A01B 73/005 172/240 |
| 8,245,489 B2 * | 8/2012 | Talbot | A01D 41/141 56/15.8 |
| 2004/0094313 A1 | 5/2004 | Myers | |
| 2007/0144132 A1 * | 6/2007 | Enns | A01B 73/005 56/228 |
| 2010/0084149 A1 | 4/2010 | Kovach et al. | |
| 2014/0041351 A1 * | 2/2014 | Bollin | A01D 41/141 56/10.2 E |
| 2018/0070531 A1 * | 3/2018 | Long | A01D 41/145 |
| 2018/0098491 A1 * | 4/2018 | Long | A01D 34/006 |
| 2018/0098496 A1 * | 4/2018 | Silver | A01D 41/14 |
| 2019/0200523 A1 * | 7/2019 | Fay, II | A01D 41/141 |
| 2021/0307233 A1 * | 10/2021 | Lyons | A01D 75/002 |
| 2021/0307247 A1 * | 10/2021 | Lyons | A01D 75/004 |

FOREIGN PATENT DOCUMENTS

| | | | |
|---|---|---|---|
| CA | 3079457 A1 * | 10/2020 | A01D 41/14 |
| CA | 3136985 A1 * | 6/2022 | A01B 59/006 |
| DE | 102019125282 A1 * | 3/2021 | A01D 41/14 |
| DE | 102013209740 B4 * | 4/2022 | A01B 73/005 |
| DE | 102021114431 A1 * | 12/2022 | A01B 73/005 |
| DE | 102022110404 A1 * | 11/2023 | A01B 63/22 |
| EP | 1055357 A1 | 11/2000 | |
| EP | 2322024 A1 | 5/2011 | |
| EP | 2965613 A1 * | 1/2016 | A01B 73/005 |
| EP | 3669624 A1 * | 6/2020 | A01B 73/005 |
| EP | 3861848 A1 * | 8/2021 | A01D 75/002 |
| EP | 3629697 B1 * | 8/2022 | A01D 41/127 |
| GB | 1424884 A | 2/1976 | |

\* cited by examiner

WHEEL LOCKING ASSEMBLY FOR A HARVESTER HEADER

BACKGROUND

The disclosure relates generally to a wheel locking assembly for a harvester header.

A harvester may be used to harvest agricultural crops, such as barley, beans, beets, carrots, corn, cotton, flax, oats, potatoes, rye, soybeans, wheat, or other plant crops. Moreover, a harvester (e.g., combine harvester) is a type of harvester generally used to harvest certain crops that include grain (e.g., barley, corn, flax, oats, rye, wheat, etc.). During operation of a harvester, the harvesting process may begin by removing a plant from a field, such as by using a header. The header may cut the agricultural crops and transport the cut crops to a processing system of the harvester.

Generally, the harvester may be driven through a field to collect and process crops. As the harvester encounters agricultural crops in the field, the header, which is positioned at a front of the harvester, cuts a portion of each crop. The vertical position of the header may be adjusted to enhance performance of the harvester (e.g., by cutting the crops at a desired height). For example, the header may include wheels that are adjustable to control the vertical position of the header. The wheels can move to a raised position in which the wheels do not contact the ground. However, the wheels may drop to an undesired position due to vibrations as the header moves through the field.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In certain embodiments, a wheel assembly of a harvester header according includes a latch and a pin. The pin is configured to engage the latch while a wheel of the wheel assembly is at a first position and the pin is configured to disengage the latch while the wheel of the wheel assembly is at a second position. Engagement of the pin and the latch is configured to block movement of the wheel relative to a frame of the harvester header.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION OF THE DRAWINGS

Figure 1:
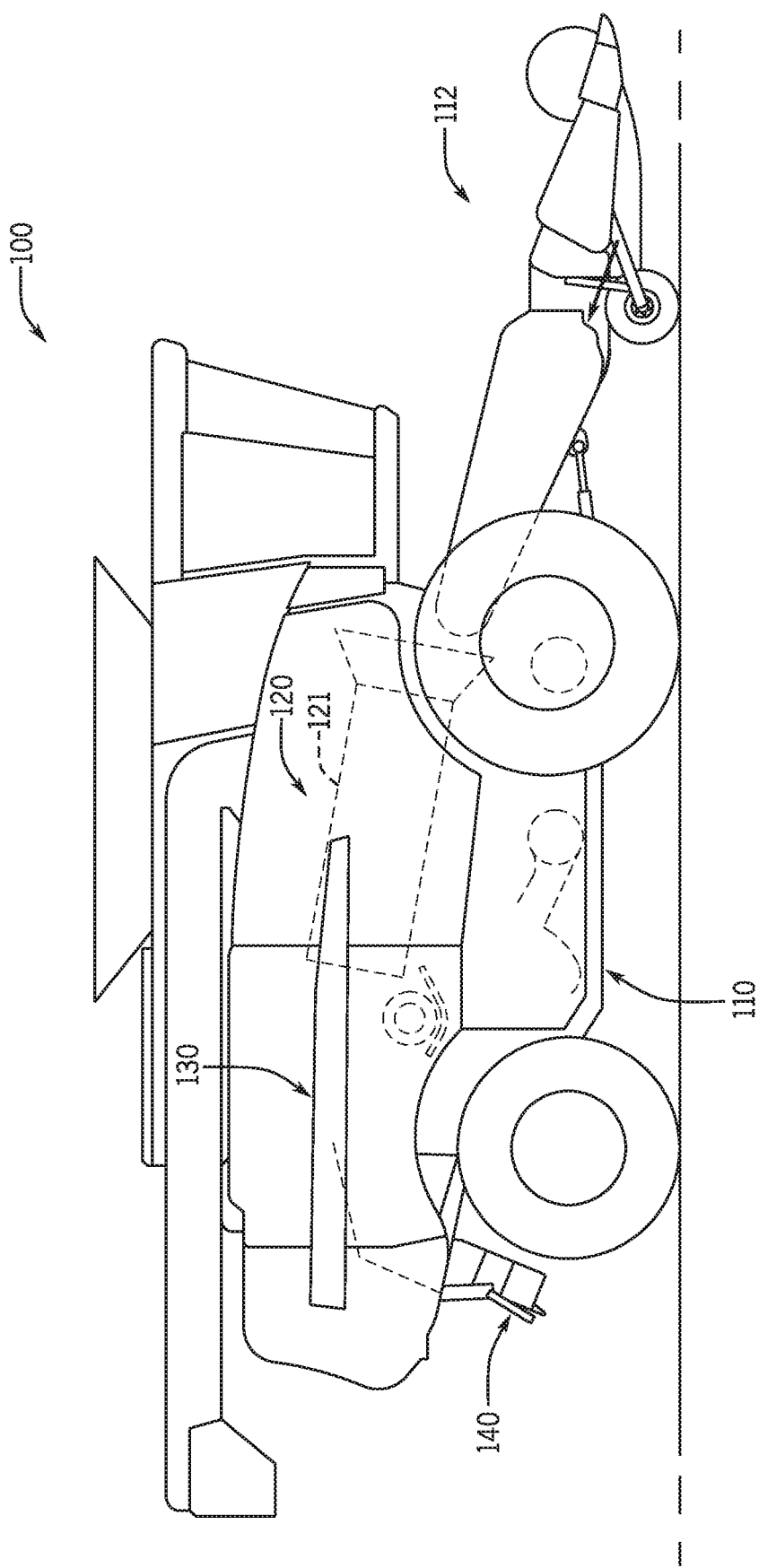
FIG. 1 is a side view of an embodiment of a harvester having a header, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The process of farming typically begins with planting seeds within a field. Over time, the seeds grow and eventually become harvestable crops. Typically, only a portion of each crop is commercially valuable, so each crop is harvested to separate the usable material from the remainder of the crop. For example, a harvester may cut agricultural crops within a field via a header. The header may also gather the cut agricultural crops into a processing system of the harvester for further processing. The processing system may include a threshing machine configured to thresh the agricultural crops, thereby separating the crops into certain desired agricultural materials, such as grain, and material other than grain (MOG). The desired agricultural materials may be sifted and then accumulated into a tank. When the tank fills to capacity, the materials may be collected from the tank. The MOG may be discarded from the harvester (e.g., via a spreader).

As mentioned, the header may include wheels. Specifically, the header may include a set of wheels that are positioned at different configurations of the header. For example, in a harvesting configuration, the wheels may be positioned to engage the ground to facilitate controlling a height of the header to cut the crops. In a transportation configuration, the wheels may be positioned to contact the ground to facilitate driving and directing of the header while the header is transported (e.g., towed). In certain configurations, the wheels may also be positioned to not contact the ground. In any case, the position of the wheels may be adjusted based on the configuration of the header. For certain headers, a hydraulic system is used for adjusting a position of each wheel. For example, a wheel may be coupled to a rod of a hydraulic cylinder configured to receive incompressible fluid (e.g., a liquid). The rod may be coupled to a piston configured to move within a cylinder body of the hydraulic cylinder to extend the rod out of and retract the rod into the cylinder body to move the wheel into a target position. In particular, to extend the rod, fluid may be added to a cap end of the hydraulic cylinder to impart a force onto the piston in a direction that extends the rod out of the cylinder body. To retract the rod, fluid may be added to a rod end of the hydraulic cylinder to impart a force onto the rod in a direction that retracts the rod into the cylinder body. To position the wheel in a target position, a certain amount of fluid may be added to the hydraulic cylinder in the corresponding section. That is, to extend the rod to a target position, a certain amount of fluid may be added to the cap end of the hydraulic cylinder to impart enough force for the rod to be extended to the target position. Likewise, to retract the rod to a target position, a certain amount of fluid may be added to the rod end of the hydraulic cylinder to impart enough force for the rod to be retracted to the target position.

When the wheel is at the target position, the position may be held by maintaining a position of the rod within the cylinder body. Typically, the position is held when the amount of fluid in each section of the hydraulic cylinder is maintained. In this manner, no force is imparted on the rod in any direction that may cause the rod to extend or retract. The piston may be positioned within the cylinder body generally to block fluid from passing through the rod from one section to another (e.g., from the cap end to the rod end and vice versa) within the cylinder body. However, in certain hydraulic systems, a small amount of fluid may still be able to pass around the piston from one section to another, which may result in undesired movement of the rod, thereby causing the wheels to fall under gravity, for example. As a result, unwanted movement of the rod may occur, which may also move the wheel out of the target position. Movement of the wheel out of the target position may affect a performance of the header and/or the harvester. In some instances, the wheel may be repeatedly adjusted to compensate for the unwanted movement, which may produce unwanted power consumption to control the wheel.

Thus, in accordance with certain embodiments of this disclosure, a system to lock the wheel in a target position may be employed, thereby blocking undesired movement of the wheel. For example, the wheel assembly includes a pin, a wheel, and an arm. The pin may be configured to engage a latch when the wheel is in a retracted position. When the pin is engaged with the latch, the pin may be generally secured to the latch to maintain the position of the wheel. The pin may remain engaged with the latch until a sufficient amount of force is applied by the hydraulic cylinder to drive the pin to disengage from the latch. Vibrations associated with operation of the header may not sufficient enough force to disengage the pin from the latch, but actuating the hydraulic cylinder may generate sufficient force to disengage the pin from the latch. Although this disclosure primarily discusses use of a hydraulic system to control a position of a wheel of a header, that other systems, such as electromechanical and/or pneumatic systems, may be used to control the position of the wheel. Additionally, a pin and latch assembly may also be used to maintain a position of any other suitable component of the harvester in addition to wheels of the header. Further, as used herein, a harvester includes any variation of a harvester, including a combine harvester, that may use a header for harvesting.

Turning now to the drawings, FIG. 1 is a side view of a harvester 100 having a header. The harvester 100 includes a chassis 110 that supports harvesting apparatus to facilitate harvesting crops. As described in greater detail below, the header 112 (e.g., grain header) that cuts crops and directs the cut crops toward an inlet of a crop processing system 120 of the harvester 100 for further processing of the cut crops. The crop processing system 120 receives cut crops from the header 112. As an example, the crop processing system 120 includes a thresher 121 that conveys a flow of crops through the crop processing system 120. In some embodiments, the thresher 121 includes a cylindrical threshing rotor that transports the crops in a helical flow path. In addition to transporting the crops, the thresher 121 may also separate certain desired crop material (e.g., grain) from residue (e.g., MOG), such as husk and pods, and direct the residue into a cleaning system located beneath the thresher 121. The residue may be transported to a crop residue handling system 130, which may hold the crop residue for further processing and/or expel the crop residue from the harvester 100 via a crop residue spreading system 140 positioned at the aft end of the harvester 100.

Figure 2:
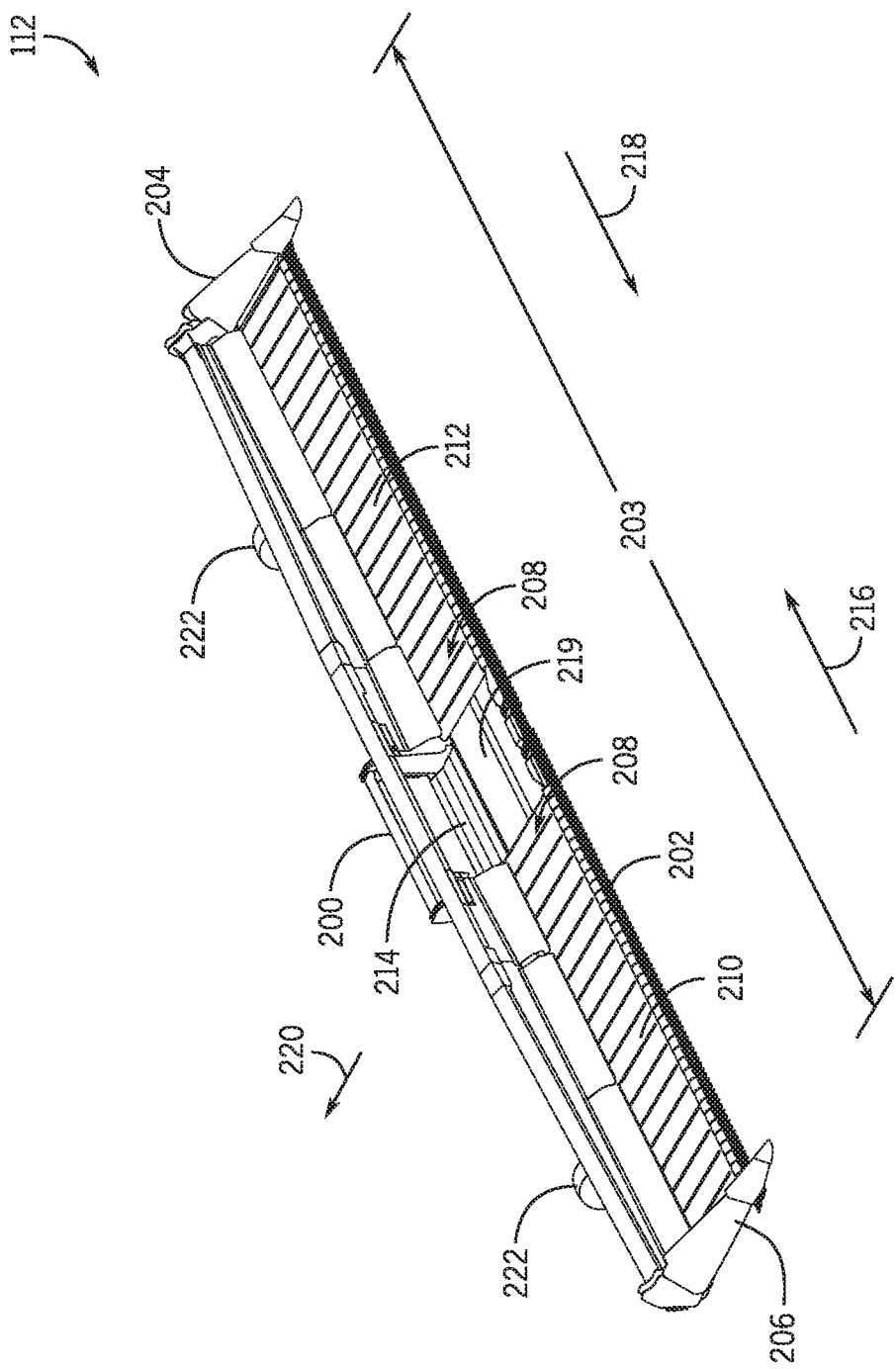
FIG. 2 is a perspective view of an embodiment of a header (e.g., grain header) that may be coupled within the harvester of FIG. 1, in accordance with an aspect of the present disclosure.

FIG. 2 is a top perspective view of an embodiment of a header 112 that may be used within the harvester 100 of FIG. 1. The header 112 includes a frame 200 that may be removably coupled to a frame of the harvester 100. The header 112 also includes a cutter bar 202 that extends across a width 203 of the frame 200 between side portions 204, 206 of the frame 200. When the harvester 100 is in operation, blades of the cutter bar 202 engage and cut the crops. The portions of the crops that are cut may be directed onto a conveyor 208 of the header 112 by a reel assembly (not shown). The conveyor 208 includes a first conveyor section 210 and a second conveyor section 212. The first conveyor section 210 and the second conveyor section 212 are separate from one another. The first conveyor section 210 extends along a portion of the width 203, and the second conveyor section 212 extends along another portion of the width 203. In general, the conveyor 208 is configured to transport cut crops toward an inlet 214. As an example, the first conveyor section 210 may direct the crops in a first direction 216 toward a center section 219, and the second conveyor section 212 may direct the crops in a second direction 218 toward the center section 219. The center section 219 may then direct the crops to the inlet 214 in a third direction 220 toward the crop processing system 120. In certain embodiments, the third direction 220 may be transverse to the first direction 216 and the second direction 218.

The header 112 includes wheels 222 to facilitate movement of the header 112 when the harvester 100 is in operation. The wheels 222 may engage the ground to control a height of the header 112. In certain embodiments, a position of each wheel 222 is adjustable to control the header height. For example, the wheels 222 may be positioned to control a height of the cutter bar 202 with respect to the ground to control where crops are cut. The wheels 222 may additionally or alternatively be retracted and not engage the ground, such as when height of the cutter bar 202 is controlled by hydraulic cylinders of the harvester 100. In some embodiments, the wheels 222 may be adjustable between an extended position and a retracted position. As an example, the extended position may position the wheels 222 to engage the ground, and the retracted position may position the wheels 222 to disengage the ground. The wheels 222 may be set to a position as desired based on the configuration of the header 112. As previously mentioned, the wheels 222 may move out of a target (e.g., retracted) position, which may affect the performance of the header 112. For example, the wheels 222 may move from the retracted position to the extended position and contact the ground, which may interfere with cutter bar height control when control of the cutter bar height via hydraulic cylinders of the harvester 100 is desirable. Thus, it may be desirable to block the wheels 222 from shifting to an undesired position. As discussed in detail below, a system to lock a position of each wheel 222 is disclosed, which may enhance the performance of the header 112.

Figure 3:
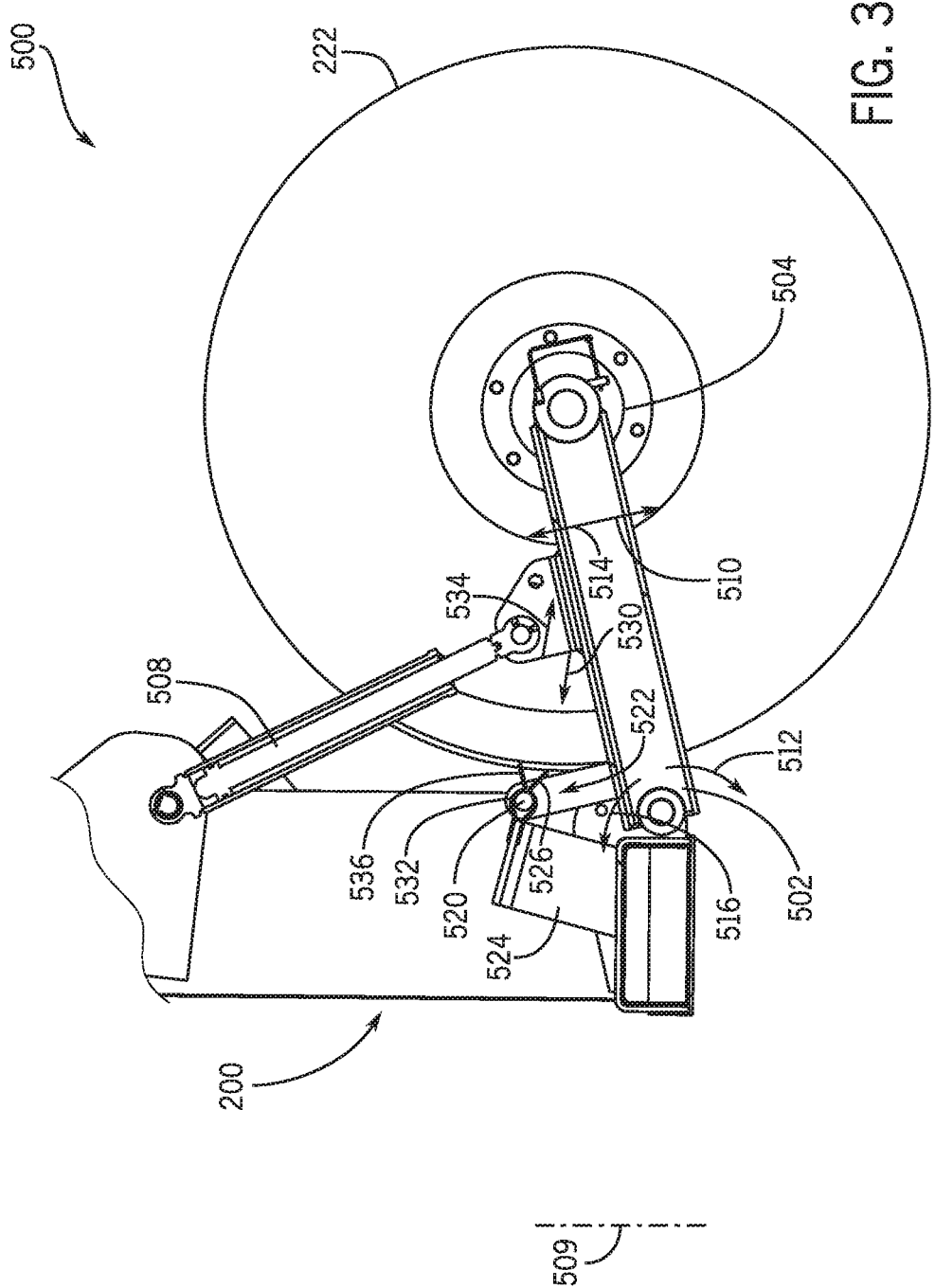
FIG. 3 is a cross-sectional side view of an embodiment of a wheel assembly that may be employed within the header of FIG. 2, in which the wheel assembly is in a retracted configuration, in accordance with an aspect of the present disclosure.

FIG. 3 is a side view of an embodiment of a wheel assembly 500 that may be employed within the header of FIG. 2, in which the wheel assembly 500 is in the retracted position. As illustrated in FIG. 3, the wheel assembly 500 includes a wheel 222 and a wheel rod 502 coupling a hub 504 of the wheel 222 to the frame 200. The wheel rod 502 is also coupled to an actuator 508 configured to extend and retract to rotate the wheel rod 502. The wheel rod 502 is rotatably coupled to the frame 200. Accordingly, when the actuator 508 extends and retracts, the wheel rod 502 is driven to rotate relative to the frame 200. Rotation of the wheel rod 502 moves the wheel 222 along a vertical axis 509 between an extended and a retracted position. When the actuator 508 extends in a first direction 510, the wheel 222 is driven to rotate in a second direction 512. When the actuator 508 retracts in a third direction 514, the wheel 222 is driven to rotate in a fourth direction 516. When the actuator 508 is fully retracted, the wheel assembly 500 is in the retracted position. As previously discussed, the wheel 222 may be retracted to block the wheel 222 from engaging the ground, such as when hydraulic cylinders of the harvester 100 control the height of the cutter bar 202 or when the header 112 is being transported. Indeed, the wheel 222 may undesirably adjust the height of the cutter bar 202 when the wheel 222 engages the ground. Thus, the wheel 222 may be retracted to avoid contacting the ground. To retract the wheel 222 in the third direction 514, the actuator 508 may impart a force on the wheel rod 502 to move the wheel 222 in the fourth direction 516. Additionally, the actuator 508 may maintain the position of the wheel 222 in the retracted position, such as against a force of gravity imparted on the wheel 222 in the second direction 512. In other words, gravity may impart a force on the wheel 222 to urge the wheel 222 to move in the second direction 512. The actuator 508 may impart a force on the wheel against gravity to block movement of the wheel 222 in the second direction 512. In some embodiments, the actuator 508 may be a hydraulic cylinder and may block movement of the wheel 222 by maintaining an amount of fluid in each section of the hydraulic cylinder. However, the actuator 508 may also be another type of actuator, such as an electrical actuator and may control movement of the wheel 222 based on an amount of current supplied to the electric actuator. The actuator 508 may be unable to maintain the wheel 222 in the retracted position and as such, the wheel 222 may begin to undesirably rotate in the second direction 512 due to the force of gravity.

To block the wheel 222 from rotating in the second direction 512 to a position that may interfere with operation of the header 112 (e.g., where the wheel 222 may contact the ground), a pin 520 is coupled to the wheel rod 502 and is configured to engage a latch 522 coupled to a latch bracket 524 of the frame 200. The latch 522 includes an inlet assembly 526 configured to receive the pin 520. Generally, when the actuator 508 retracts in the first direction 510, the wheel rod 502 is rotated in the fourth direction 516, which directs the pin 520 into the latch 522 in a fifth direction 530, thereby causing the pin 520 to exert a force upon the inlet assembly 526. When the retraction of the actuator 508 causes the pin 520 to exert a sufficient force onto the inlet assembly 526, the inlet assembly 526 opens and enables the pin 520 to be inserted into an opening 532. The pin 520 may remain within the opening 532 until the pin 520 exerts a force in a sixth direction 534, opposite the fifth direction 530, onto an exit assembly 536 sufficient to open the exit assembly 536. The pin 520 may exert the force in the sixth direction 534 in response to extension of the actuator 508 extends in the third direction 514. When the pin 520 exerts sufficient force in the sixth direction 534, the exit assembly 536 may open to enable the pin 520 to be removed from the opening 532 and to be released from the latch 522, thereby facilitating downward movement of the wheel 222.

Figure 4:
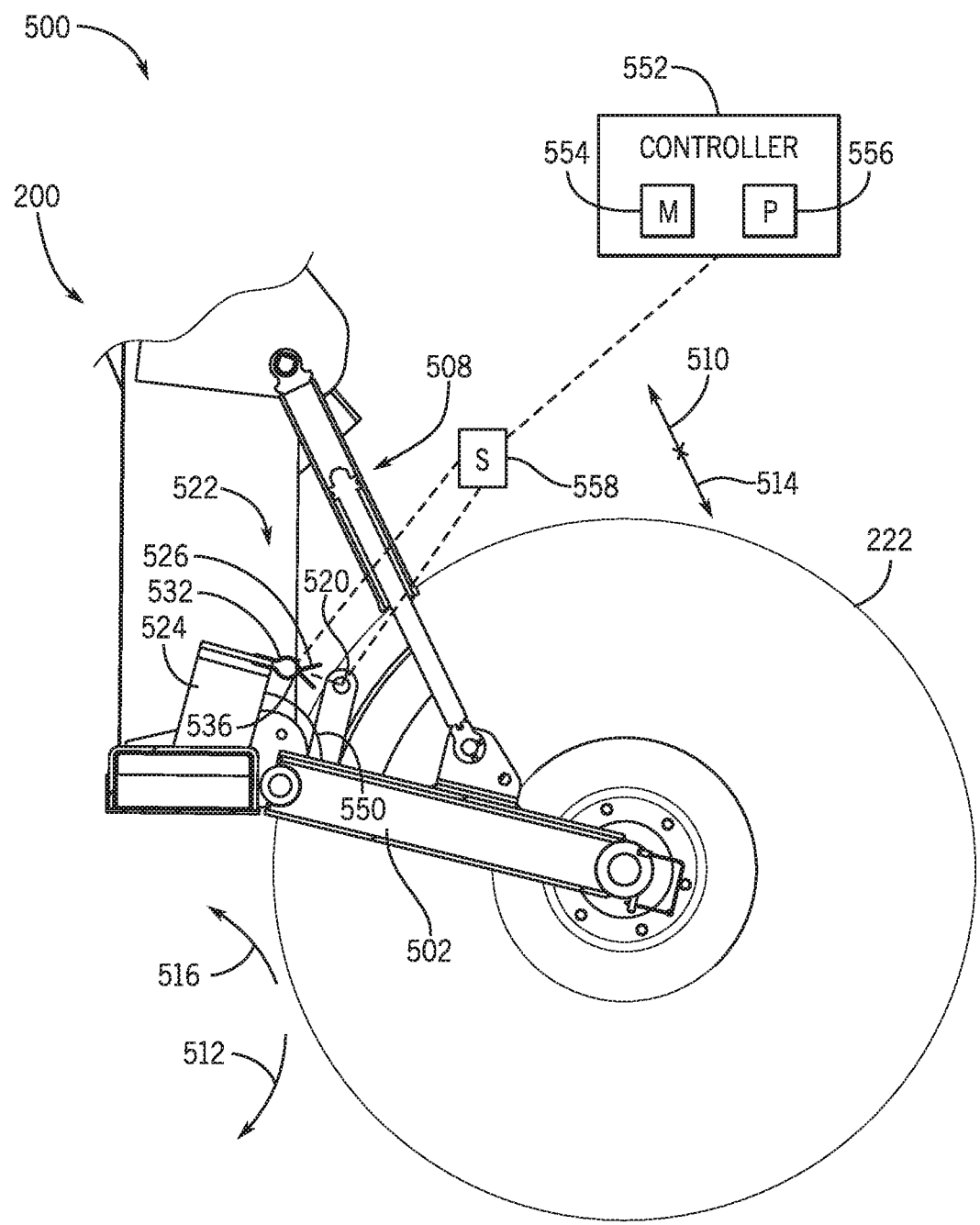
FIG. 4 is a cross-sectional side view of the wheel assembly of FIG. 3 in an extended configuration, in accordance with an aspect of the present disclosure.

FIG. 4 is a side view of the wheel assembly 500 of FIG. 3 in an extended configuration. The actuator 508 is extended in the third direction 514 to move the wheel assembly 500 to an extended position. With the wheel in the extended position, the pin 520 is removed from the opening 532 of the latch 522. As mentioned above, extending the actuator 508 rotates the wheel rod 502 in the second direction 512 with sufficient force to open the exit assembly 536.

In some embodiments, the latch bracket 524 may also be configured to rotate in the second direction 512 and the fourth direction 516 to some degree to facilitate engagement of the pin 520 with the latch 522. Specifically, adjusting the position of the latch bracket 524 via rotating the latch bracket 524 may adjust an angle 550 between the wheel rod 502 and the latch bracket 524 to enable the pin 520 to exert a force onto the inlet assembly 526 and/or the exit assembly 536. In other words, the latch bracket 524 may rotate about the frame 200 as the arm 502 is rotated about the frame 200, which may facilitate the pin 520 to engage the latch 522. As an example, rotation of the latch bracket 524 may facilitate the pin 520 to exert a force upon the inlet assembly 526 to direct the pin 520 into the latch 522. In this manner, rotation of the latch bracket 524 may facilitate inserting the pin 520 into and/or removing the pin 520 from the latch 522.

There may be a selected angle 550 in which the pin 520 is fully inserted into the latch 522, in which the pin 520 is fully removed from the latch 522, and in which the pin 520 is exerting a force onto the inlet assembly 526. For example, the pin 520 may be removed from the latch 522 when the angle 550 is greater than 45 degrees, and the pin 520 may be inserted into the latch 522 when the angle 550 is less than 45 degrees. In certain embodiments, the angle 550 is selected based on a target raised position of the wheel 222.

The system of FIGS. 3 and 4 may be employed in other wheels of the header 100. For example, the header 100 may include a set of wheels that engage the ground when the header 100 is being transported and that disengage the ground when the header 100 is harvesting. In this manner, the pin 520 may be engaged with the latch 522 when the header 100 is being transported, while the pin 520 may be disengaged with the latch 522 when the header 100 is harvesting.

In certain embodiments, a controller 552 is communicatively coupled to the actuator 508 and is configured to control the actuator 508. The controller 552 includes a memory 554 and a processor 556 (e.g., a microprocessor). The memory 554 may be a mass storage device, a flash memory device, removable memory, or any other nontransitory computer-readable medium that contains instructions regarding control of the actuator 508. The memory 554 may also include volatile memory such as randomly accessible memory (RAM) and/or non-volatile memory such as hard disc memory, flash memory, and/or other suitable memory formats. The processor 556 may be configured to execute the instructions stored in the memory 552 to control the actuator 508. Although the illustrated embodiment includes one controller 552 communicatively coupled to the actuation, the header 112 may include multiple controllers 552.

In some embodiments, the instructions include adjusting the actuator 508 to a particular position based on the configuration of the header 112. For example, in the harvesting configuration, the controller 552 may be configured to instruct the actuators 508 to extend to the extended position. Additionally, when adjusting between the extended position (i.e., when the pin 520 is removed from the latch 522) and the retracted position (i.e., when the pin 520 is inserted into the latch 522), the controller 552 may be configured to instruct the actuator 508 to cause the pin 520 to exert sufficient force to open the inlet assembly 526. In some embodiments, the controller 552 may be communicatively coupled to sensor(s) 558 that are configured to facilitate adjustment of the actuator 508. The sensor(s) 558 may be configured to detect whether the pin 520 is engaged or disengaged with the latch 522. For example, the sensor(s) 558 may be position sensors (e.g., proximity sensor, linear variable differential transformer, rotary variable differential transformer, potentiometer) configured to detect a position of the pin 520, the latch 522, and/or the actuator 508. The sensor(s) 558 may also be configured to detect another operating parameter to enable the controller 552 to engage or disengage the latch 522. For example, the sensor(s) 558 (e.g., force transducers) may be configured to detect an amount of force imparted on the pin 520 and/or the latch 522 to enable the controller 552 to determine if enough force is imparted to engage or disengage the pin 520 from the latch 522. The sensor(s) 558 may additionally or alternatively be configured to detect an operating parameter of the actuator 508 (e.g., a hydraulic fluid within the cylinder body, a supplied current) to determine whether the actuator 508 is operated to engage or disengage the pin 520 from the latch 522.

When the wheel 222 is in contact with the ground, the weight of the header 112 may impart a force on the actuator 508 to urge the actuator 508 to retract in the first direction 510. In other words, gravity may cause the weight of the header 112 to urge the actuator 508 be retract. In the extended position, the actuator 508 may impart a force to maintain the extended position and block the wheel rod 502 from rotating in the fourth direction 516. Thus, in additional or alternative embodiments, another pin 520 and latch 522 may be utilized to maintain the wheel assembly 500 in the extended position until the actuator 508 imparts a sufficient force to remove the pin 520 from the latch 522 to retract the wheel 222. Although this disclosure primarily discusses adjusting the wheel 222 between an extended and a retracted position, in additional or alternative embodiments, the wheel 222 may be adjusted in an intermediate position between the extended and retracted positions. To this end, the assembly of the pin 520 and the latch 522 may maintain the wheel 222 in the intermediate position.

Although the wheel assembly 500 includes one pin 520 and one latch 522 in the illustrated embodiment, in other embodiments, the wheel assembly may include any suitable number of pins and latches. In some embodiments, the wheel assembly may include the same number of pins as latches, but in additional or alternative embodiments, the wheel assembly may include a different number of pins and latches, in which one pin may be configured to engage multiple latches based on the position of the wheel, for example.

Figure 5:
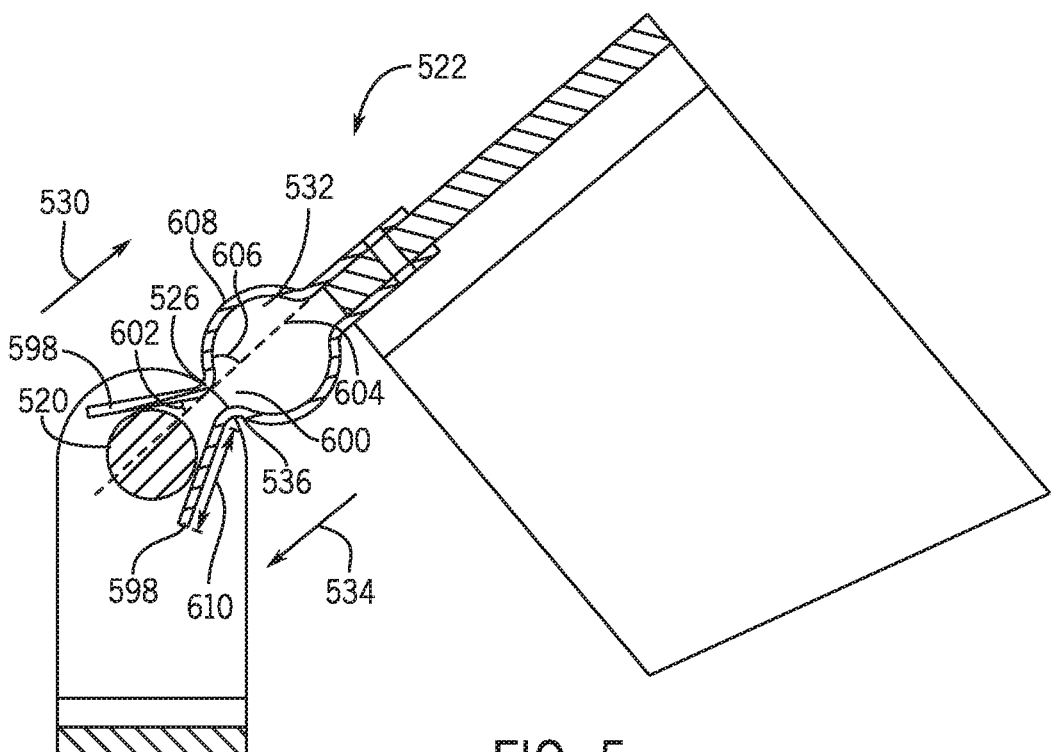
FIG. 5 is a cross-sectional side view of an embodiment of a latch and a pin, which may be used in the wheel assembly of FIG. 3, in accordance with an aspect of the present disclosure.

FIG. 5 is a side view of the pin 520 and the latch 522, which may be used in the wheel assembly 500 of FIG. 3. In certain embodiments, the latch 522 may be shaped such that the force sufficient to remove the pin 520 from the latch 522 is greater than the force sufficient to insert the pin 520 into the latch 522. For example, as depicted in FIG. 5, the pin 520 has an annular shape. When the pin 520 is directed in the fifth direction 530 into the latch 522 (e.g., when the actuator 508 retracts), the inlet assembly 526 opens more easily due to the geometry of the pin 520. The inlet assembly 526 includes segments 598 that are substantially straight and angled outward from a neck 600 of the inlet assembly 526 to enable the pin 520 to be inserted between the segments 598. When the pin 520 imparts sufficient force upon the segments 598, the segments 598 open to enable the pin to pass through the neck 600 into the opening 532. Additionally, the exit assembly 536 has an arcuate shape that generally blocks the pin 520 from opening the exit assembly 536, thereby increasing the force sufficient to enable the pin 520 to pass through the neck 600 and be removed from the opening 532. Further, a first angle 602 between each segment 598 of the inlet assembly 526 and an axis 604 parallel to the fifth direction 530 and the sixth direction 534 may be smaller than a second angle 606 between a border 608 of the exit assembly 536 and the axis 604. A smaller angle may generally be associated with a smaller amount of force sufficient to cause the pin 520 to move through the inlet assembly 526 and/or the exit assembly 536. Thus, the first angle 602 may be less than the second angle 606 to enable the inlet assembly 526 to open with application of a force smaller than application of a force to open the exit assembly 536. In this manner, the pin 520 may be inserted into the opening 532 using a force lower than a force to remove the pin 520 from the opening 532.

The geometry of the latch 522 may be modified to control the amount of force sufficient to open the inlet assembly 526 and/or to open the exit assembly 536. For example, the first angle 602 may be adjusted and/or a length 610 of a segment 598 may be adjusted to control the amount of force sufficient to insert the pin 520 into the latch 522. Likewise, the second angle 606 may be adjusted (e.g., via adjusting the shape of the border 608) to control the amount of force sufficient to remove the pin 520 from the latch 522.

Figure 6:
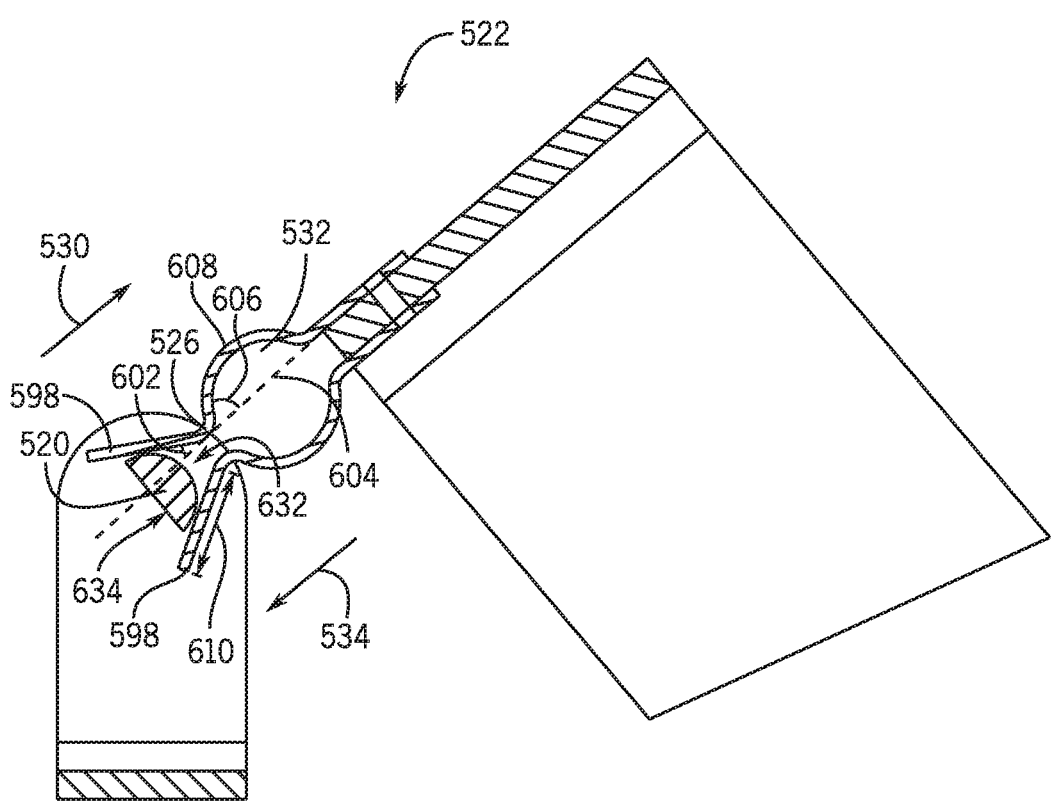
FIG. 6 is a cross-sectional side view of another embodiment of a latch and a pin, which may be used in the wheel assembly of FIG. 3, in accordance with an aspect of the present disclosure.

The geometry of the pin 520 may also be adjusted to control an amount of force sufficient to open the inlet assembly 526. In FIG. 6, which is a side view of another embodiment of the pin 520 and the latch 522, the pin 520 includes a front section 632 that is arcuate in shape, and the pin 520 includes a back section 634 that is substantially flat. The front section 632 may enable the inlet assembly 526 more easily open around the curvature of the front section 632 when the pin 520 engages the segments 598. Moreover, when the pin 520 is inserted into the latch 522, the back section 634 may generally block the pin 520 from being removed from the latch 522. The flatter geometry of the back section 634 may abut the border 608 rather than facilitate opening the exit assembly 536. As such, a greater amount of force may be exerted on the pin 520 before the exit assembly 536 is opened.

While the pin 520 has a curved shape (e.g., circular and/or arcuate) in the embodiments disclosed above, additional or alternative embodiments of the pin may be any suitable shape, such as a rectangular and/or triangular shape. Additionally, although the opening 532 has a circular shape in the embodiments disclosed above, the opening may have any suitable shape that may accommodate the shape of the pin. The amount of force sufficient to insert the pin and/or to remove the pin from the latch may be based at least in part on certain parameters of the pin and/or the latch. For example, the pin and/or the latch may be shaped such that an amount of force sufficient to remove the pin from the latch is a certain factor greater than the weight of the wheel 222. As such, the latch may not release the pin due to the weight of the wheel 222 and/or other forces (e.g., from bumps when operating the header, from debris contacting the header) to maintain the pin within the opening. In general, the pin and/or the latch may be shaped such that an amount of force sufficient to insert the pin into the latch is a certain factor less than the amount of force sufficient to remove the pin from the latch. In this manner, the pin is configured to be inserted into the latch more easily than removed from the latch and thus, the retracted position of the wheel assembly may be more easily maintained to block undesired contact of the wheel with the ground. In some embodiments, the geometries of the pins and/or the latches may be different for different wheel assemblies. That is, the amount of force sufficient to engage and/or disengage the pin with the latch may be different for different wheel assemblies.

The amount of force sufficient to insert the pin 520 into and/or remove the pin 520 from the latch 522 may also be based at least in part on a material of the pin 520 and/or the latch 522. For example, the pin 520 and/or the latch 522 may include a metal, a polymer, a composite, another material, or any combination thereof, and the force sufficient to insert the pin 520 into and/or remove the pin 520 from the latch 522 may be based on a strength, an elasticity, a coefficient of friction, another suitable parameter, or any combination thereof of the material. In this manner, the force sufficient to insert the pin 520 into and/or remove the pin 520 from the latch 522 reduces stress on the pin 520 and/or the latch 522.

Figure 7:
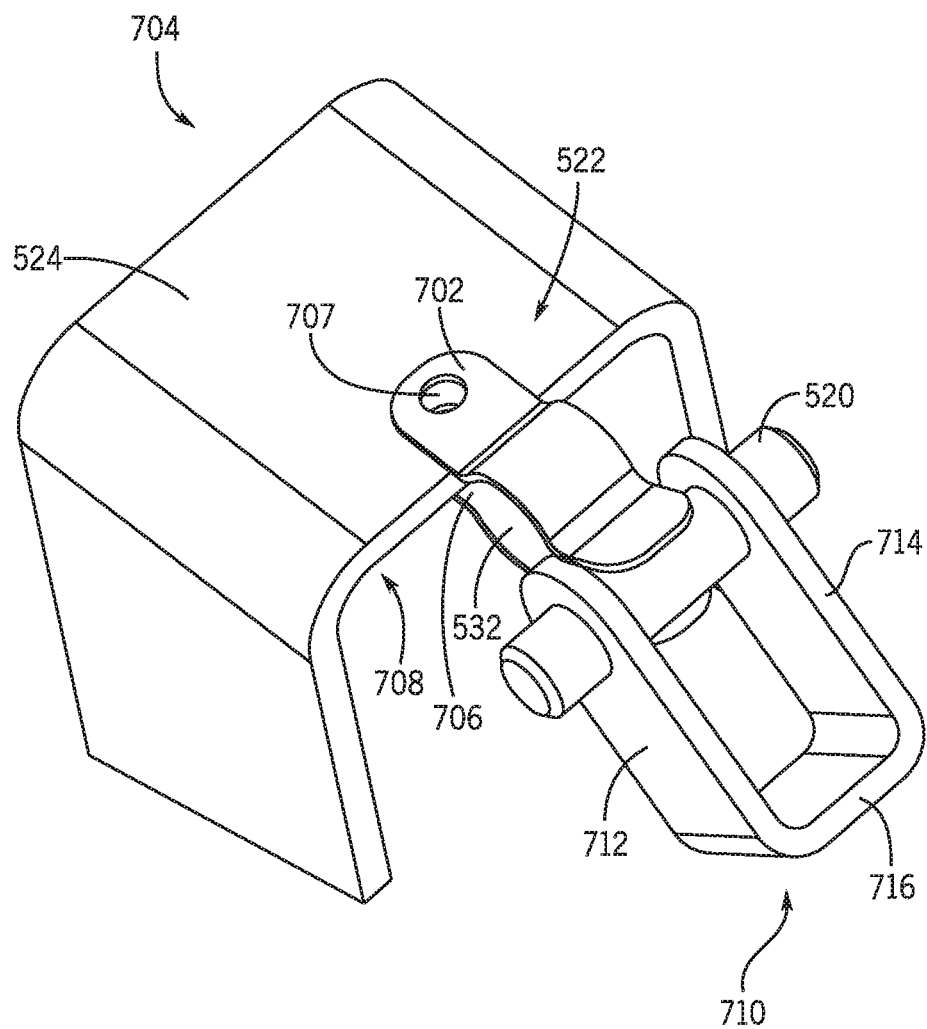
FIG. 7 is a perspective view of an embodiment of a latch and a pin, which may be used the wheel assembly of FIG. 3, in accordance with an aspect of the present disclosure.

FIG. 7 is a perspective view of an embodiment of the pin 520 and the latch 522, which may be used in the wheel assembly of FIG. 3. In some embodiments, the latch 522 includes an upper portion 702 that may be disposed on a first side 704 (e.g., atop) of the latch bracket 524, and the latch 522 may include a lower portion 706 that may be disposed on a second side 708 (e.g., underneath) of the latch bracket 524, in which the upper portion 702 and the lower portion 706 are separate and unconnected from one another. Although the illustrated latch 522 includes two portions 702, 706, the latch may include any suitable number of portions to receive the pin 520. The upper portion 702 and the lower portion 706 may be aligned, and a hole 707 may pass through the latch 522 and the latch bracket 524. The hole 707 may receive a fastener, such as a screw and a nut, to clamp the latch 522 onto the latch bracket 524. In additional or alternative embodiments, the upper portion 702 and the lower portion 706 may be coupled to the latch bracket 524 via other methods, such as a rivet, a die punch, a weld, an adhesive, another suitable method, or any combination thereof. In certain embodiments, the upper portion 702 and the lower portion 706 may not be separate components. In other words, the latch 522 may be one component that includes the upper portion 702 and the lower portion 706.

In certain embodiments, the pin 520 may be inserted through a pin bracket 710 configured to couple the pin 520 to the wheel rod 502. For example, the pin 520 may be press fit through a first segment 712 and a second segment 714 of the pin bracket 710, and the first and second sections may be connected by a middle section 716. As seen in FIG. 7, the inlet assembly 526 of the latch may be configured to fit between the first segment 712 and the second segment 714 to enable the pin 520 to be inserted into the opening 532. Additionally, the first segment 712 and the second segment 714 may each extend from the middle section 716 to block the inlet assembly 526 from contacting the middle section 716 when the pin 520 is positioned within the opening 532. In some embodiments, the middle section 716 is configured to couple to the wheel rod 502.

In certain embodiments, certain existing wheel assemblies 500 may be modified to include the latch 522 and the pin 520. For example, the latch bracket 524 to be added (e.g., coupled) to the frame 200, and a pin bracket 710 may be added (e.g., coupled) to the wheel rod 502. As such, the pin 520 and the latch 522 may be retrofitted onto existing wheel assemblies 500. The dimensions of the pin 520, the latch 522, the latch bracket 524, and the pin bracket 710 may be adjusted to accommodate different wheel assemblies 500. Further, as mentioned, other components of the header 112 may use the pin 520 and the latch 522 to block unwanted movement of other existing components of the header 112, which may be retrofitted with the pin 520 and the latch 522.

Although the latch 522 is coupled to the latch bracket 524 and the pin 520 is coupled to the pin bracket 710 in the embodiments disclosed above, in some embodiments, the wheel assembly may not include the latch bracket and the pin bracket. For example, the latch may be directly coupled to the frame 200 and/or the pin may be directly coupled to the wheel rod 502. In additional or alternative embodiments, the pin and the latch may switch positions. In this manner, the latch rotates with the wheel rod 502 to couple to the pin disposed on the frame 200. In further embodiments, the latch and/or the pin may be disposed elsewhere in the wheel assembly, such as on the actuator 508, to secure the wheel 222 in a target position.

Although the present disclosure discusses inserting the pin 520 into the opening 532 of the latch 522, the pin may engage the latch in a different matter. By way of example, the pin and/or the latch may include a magnetic material to enable the pin and the latch to magnetically couple to one another. In other words, the pin and the latch may be magnetically attracted to one another and may engage when placed within a distance of one another. Further, to disengage the pin from the latch, a force may be applied to separate the pin and the latch, in which the force overcomes the magnetic force coupling the pin and the latch. In additional or alternative embodiments, the latch may include a locking element (e.g., a clasp, a clamp, etc.) to secure the pin to the latch. The locking element may be adjustable between positions, in which a first position of the locking element secures engagement of the pin with the latch and a second engagement of the locking element permits to the pin to disengage the latch. In certain embodiments, the locking element may be manually adjusted, but in additional or alternative embodiments, the locking element may be communicatively coupled to the controller to enable the locking element to be automatically adjusted and permit the pin to be removed from the latch. That is, the controller 552 may adjust the locking element between positions to secure the pin with the latch and the controller or to permit the pin to disengage the latch. For example, the controller 552 may be configured to adjust the locking element to secure the pin with the latch and further secure the wheel 222 in the retracted position. When the wheel 222 is to be extended, the controller 552 may be configured to adjust the locking element to permit the pin to disengage the latch.

While only certain features of the disclosure have been illustrated and described herein, many modifications and changes will occur to those skilled in the art. It is, therefore, to be understood that the appended claims are intended to cover all such modifications and changes as fall within the essence of the disclosure.

The invention claimed is:

1. A wheel assembly of a harvester header, comprising:
a latch; and
a pin configured to engage the latch while a wheel of the wheel assembly is at a first position and to disengage the latch while the wheel of the wheel assembly is at a second position;
wherein engagement of the pin and the latch is configured to block movement of the wheel relative to a frame of the harvester header; and
wherein the latch comprises an opening, the pin is configured to be disposed within the opening while the pin is engaged with the latch, and the pin is configured to be positioned outside of the opening while the pin is disengaged from the latch.

2. The wheel assembly of claim 1, wherein the latch further comprises an inlet assembly and an exit assembly, and the pin is configured to engage the opening via the inlet assembly, and the pin is configured to disengage the opening via with the exit assembly.

3. The wheel assembly of claim 2, wherein the inlet assembly comprises a first segment and a second segment, the pin is configured to engage the opening via movement between the first segment and the second segment, the exit assembly comprises a first portion and a second portion, and the pin is configured to disengage the opening via movement between the first portion and the second portion.

4. The wheel assembly of claim 3, wherein the inlet assembly and the exit assembly form a neck, the neck is configured to open in response to a first force applied against the inlet assembly by the pin and the neck is configured to open in response to a second force applied against the exit assembly by the pin, and the second force is greater than the first force.

5. The wheel assembly of claim 3, wherein the first segment and the second segment are substantially straight.

6. The wheel assembly of claim 2, wherein the exit assembly has a substantially arcuate shape.

7. The wheel assembly of claim 2, wherein the pin comprises an arcuate portion configured to engage the inlet assembly to facilitate inserting of the pin into the opening.

8. The wheel assembly of claim 2, wherein the pin comprises a straight portion configured to engage the exit assembly in response to movement of the wheel from the first position toward the second position.

9. A wheel assembly of a harvester header, comprising:
an actuator configured to move a wheel of the wheel assembly between a first position and a second position;
a latch; and
a pin configured to engage the latch while the wheel is at the first position and to disengage the latch while the wheel is at the second position;
wherein engagement of the pin and the latch is configured to block movement of the wheel relative to a frame of the harvester header; and
wherein the latch comprises an opening, the pin is configured to be disposed within the opening while the pin is engaged with the latch, and the pin is configured to be positioned outside of the opening while the pin is disengaged from the latch.

10. The wheel assembly of claim 9, wherein the actuator is configured to retract to move the wheel from the second position to the first position, and the actuator is configured to extend to move the wheel from the first position to the second position.

11. The wheel assembly of claim 9, wherein the actuator comprises a hydraulic cylinder configured to adjust the wheel to the first position in response to receiving fluid at a rod end of the hydraulic cylinder and wherein the hydraulic cylinder is configured to adjust the wheel to the second position in response to receiving fluid at a cap end of the hydraulic cylinder.

12. The wheel assembly of claim 9, wherein the actuator is configured to be coupled to a wheel rod of the wheel assembly, the wheel is coupled to the wheel rod, and the actuator is configured to move the wheel rod to rotate the wheel about the frame of the harvester header.

13. The wheel assembly of claim 9, further comprising a controller configured to:
instruct the actuator to move the wheel to the first position for a transporting configuration of the harvester header, and
instruct the actuator to move the wheel to the second position for a harvesting configuration of the harvester header.

14. A wheel assembly of a harvester header, comprising:
a wheel rod configured to be rotatably coupled to a frame of the harvester header;
a wheel coupled to the wheel rod;
an actuator coupled to the wheel rod, the actuator is configured to:
rotate the wheel rod about the frame to move the wheel relative to the frame;
move the wheel to a first position; and
move the wheel to a second position;
a latch configured to be coupled to the frame of the harvester header; and
a pin coupled to the wheel rod, the pin configured to:
engage the latch while the wheel is at the first position; and
disengage the latch while the wheel rod is at the second position;
wherein engagement of the pin and the latch is configured to block movement of the wheel relative to the frame; and
wherein the latch comprises an opening, the pin is configured to be disposed within the opening while the pin is engaged with the latch, and the pin is configured to be positioned outside of the opening while the pin is disengaged from the latch.

15. The wheel assembly of claim 14, wherein the pin is configured to engage the opening via an inlet assembly of the latch, and the pin is configured to disengage the opening via an exit assembly of the latch.

16. The wheel assembly of claim 14, actuator is configured to move the wheel to the first position for a transportation configuration of the harvester header, and the actuator is configured to be move the wheel to the second position for a harvesting configuration of the harvester header.

17. The wheel assembly of claim 14, wherein the latch is configured to rotate about the frame.

18. The wheel assembly of claim 14, wherein the actuator is configured to extend to move the wheel from the first position to the second position, and wherein the actuator is configured to retract to move the wheel from the second position to the first position.

* * * * *